No. 768,477. PATENTED AUG. 23, 1904.
J. McKINLEY.
HOSE REPAIRING LINING.
APPLICATION FILED MAR. 17, 1904.
NO MODEL.

WITNESSES:
D. H. Fulmer
J. J. Laass

INVENTOR
Judson McKinley
By E. Laass
ATTORNEY.

No. 768,477. Patented August 23, 1904.

UNITED STATES PATENT OFFICE.

JUDSON McKINLEY, OF SYRACUSE, NEW YORK.

HOSE-REPAIRING LINING.

SPECIFICATION forming part of Letters Patent No. 768,477, dated August 23, 1904.

Application filed March 17, 1904. Serial No. 198,694. (No model.)

*To all whom it may concern:*

Be it known that I, JUDSON McKINLEY, of Syracuse, in the county of Onondaga, in the State of New York, have invented new and useful Improvements in Hose-Repairing Linings, of which the following, taken in connection with the accompanying drawings, is a full, clear, and exact description.

The object of this invention is to provide simple and efficient means for preventing leakage of water-conveying hose which have been weakened or ruptured by wear and abrasion of the exterior of the hose, which injury is especially liable to occur to a hose which is subjected to being dragged on streets to be cleaned by flushing the pavement thereof.

To attain the said object, I employ an automatic hose-repairer consisting of a tube composed of closely-knit linen or analogous flexible, strong, and imperious fabric inserted endwise into the hose and expansible independently thereof to form integral bulges across the interior of the punctured or weakened portions of the hose, as hereinafter more fully explained.

Figure 1:
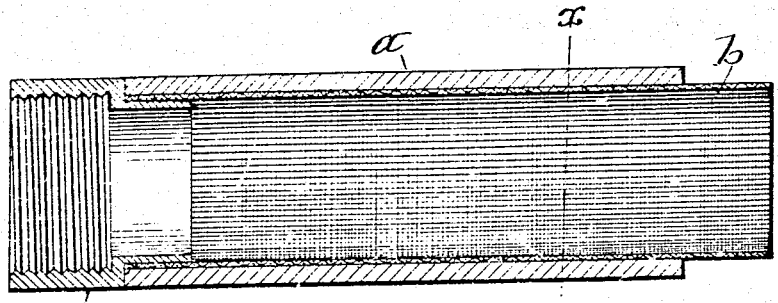
Figure 2:
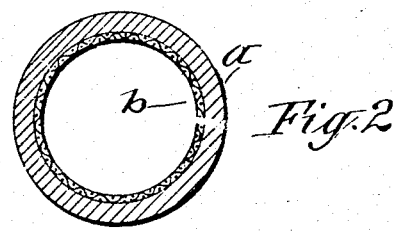
Figure 3:
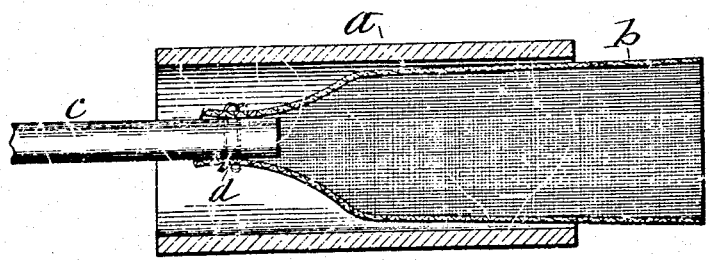

In the annexed drawings, which constitute part of this application, Figure 1 is a longitudinal section of a hose provided with my automatic repairer. Fig. 2 is a transverse section on line X X in Fig. 1, and Fig. 3 is a longitudinal section illustrating the manner of applying the lining to the hose.

$a$ represents a water-conveying hose, which may be of any suitable and well-known construction according to the purpose for which the hose is to be used.

My invention is more particularly designed for the species of hose which are subjected to high water-pressure and are liable to be injured by being dragged over the ground or pavement. It is the leakage of the hose incident to such injury which is sought to be overcome by my invention, and which I accomplish by my automatic repairer $b$, which consists of a tube formed separate from the hose and of suitable impervious textile fabric, preferably of tightly-knit linen fabric, which is comparatively thin and flexible. The exterior of this tube is of the same diameter as the interior of the hose, into which it is inserted endwise and in a collapsible condition by means of a suitable bar or stiff pipe $c$, which is drawn longitudinally through the hose and has tied to its rear end in any suitable manner the entering end of the tube $b$, as represented at $d$ in Fig. 3 of the drawings, the opposite end of said tube having in the meantime been fastened to the hose by means of the usual member C of the hose-coupling. After the tube is thus placed in the hose the bar or pipe $c$ is detached and removed and the tube is expanded and compactly seated on the interior of the hose by means of water under pressure entering the tube.

The ability of the tube $b$ of moving endwise in the hose and expanding independently thereof allows the said tube to be expanded by the pressure of the water entering it and to be thereby pressed into the shape of impervious bulges extending across the interior of the injured portions of the hose, and thus prevent leakage thereat.

What I claim as my invention is—

The combination, with a water-carrying hose, of an automatic repairer consisting of a tubular lining composed of impervious knitted linen fabric formed separate from the hose and expansible longitudinally and circumferentially independent of the hose and yielding to pressure of the water entering said lining and thereby forming the tube with impervious bulges extending across the weakened portions of the hose as set forth.

JUDSON McKINLEY.

Witnesses:
J. J. LAASS,
L. H. FULMER.